Patented Mar. 3, 1931

1,795,120

UNITED STATES PATENT OFFICE

CHRISTIAN HANSEN, OF WIESDORF, NEAR COLOGNE-ON-THE-RHINE, GERMANY, ASSIGNOR TO I. G. FARBENINDUSTRIE AKTIENGESELLSCHAFT, OF FRANKFORT-ON-THE-MAIN, GERMANY

PROCESS FOR THE SIMULTANEOUS ABSORPTION OF AMMONIA AND HYDROGEN SULFIDE FROM INDUSTRIAL GASES

No Drawing. Application filed December 8, 1926, Serial No. 153,452, and in Germany January 7, 1926.

Up to the present time all processes for the simultaneous recovery of ammonia and hydrogen sulfide from industrial gases, as for example, coke-oven gas or illuminating gas and other like gases with direct conversion into useful products are open to numerous objections and must be considered not to be successful in actual practice.

Thus, it has been attempted, as described in German Patents Nos. 212,209, 215,907, 217,315 and 220,632 to oxidize the hydrogen sulfide present in the gas into sulfurous acid or sulfur trioxide by passing the gases over a material yielding oxygen and in conjunction therewith to cause the separation of the ammonia present with such gases in the form of solid crystalline salts. This process has not, however, found any techincal application, to some extent, probably for the reason that the complete separation of the solid salts and consequently the exhaustive elimination of the hydrogen sulfide and ammonia from the gases have not proved possible.

According to the present invention the simultaneous absorption of ammonia and hydrogen sulfide has been rendered possible by the application of a mixture of ammonium sulfite and ammonium bisulfite which constitutes a suitable medium for such simultaneous absorption of ammonia and hydrogen sulfide, some of the ammonium sulfite-bisulfite mixtures of definite compositions exhibit extraordinarily low ammonia and sulfurous acid vapour tensions.

I have found that mixtures acting most favourably contained in respect of one molecule of $SO_2$ about 1.5 to about 1.75 molecules of $NH_3$. For the sake of brevity this ratio figure will be referred to hereinafter as applied to such mixtures except where otherwise stated. Solutions in which the proportion is below this figure have indeed an increasingly better absorption capacity for both ammonia and hydrogen sulfide, however they give off increasing, though very small, quantities of sulfurous acid to the gas which is intended to be purified.

The action of ammonia on the solutions indicated is to produce from the bisulfite neutral ammonium sulfite, while the hydrogen sulfide forms with the ammonium bisulfite and sulfite essentially ammonium thiosulfate together with ammonium polythionates without any separation of sulfur taking place. This reaction can be illustrated according to the following equation:—

$2NH_4HSO_3 + 2(NH_4)_2SO_3 + 2H_2S =$
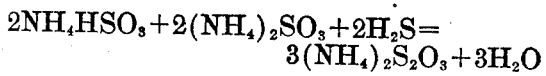
$3(NH_4)_2S_2O_3 + 3H_2O$

The present invention accordingly differs from those of German Patents Nos. 212,209, 215,907, 217,315 and 220,632 on the one hand since the removal of the ammonia and the hydrogen sulfide is effected by a wet method and on the other hand because different end products are formed viz: in one case ammonium thiosulfate together with ammonium polythionates, which are converted into ammonium sulfate and sulfur, and in the other case more or less acid ammonium sulfites and ammonium sulfates.

Ammonium sulfite-bisulfite solutions with a ratio figure of 1.5 give off, however, some very small quantity of sulfurous acid to the gas; accordingly either the proportion of ammonia to sulfurous acid in the portion of absorption liquid not consisting of thiosulfate and polythionate must be increased to about 1.6 to 1.7 or if it is intended to utilize the more favourable absorption properties of solutions of the ratio figure 1.5, the process must be carried out in two or more stages, according to which the sulfurous acid absorbed by the gas in the first stage is removed in the second stage by the application of a mixture of the highest permissible ratio figure of about 1.75 in said second stage. In such a case the ratio figure of the liquid to be used in the first stage can be still further reduced, for example to 1.2 to 1.3, so that the prevailing still better absorption capacity of the bisulfite-sulfite mixture especially for hydrogen-sulfide is utilized to further advantage.

Due to the absorption of ammonia, an increase takes place in the ratio figure $NH_3:SO_2$ in the sulfite-bisulfite portion and consequently a reduction of the capacity for absorption, particularly for hydrogen sulfide. Thus care must be taken to maintain the predetermined most favourable proportions by the addition of a corresponding quantity of sulfurous acid.

Such a process can be effected in many ways, as for instance, by rendering the process continuous, thus that the wash liquid after the passage of the gas through the washing apparatus is exposed in a second washing apparatus to the action of sulfurous acid and is then re-introduced into the first apparatus. Or the process may be carried out in a discontinuous manner, according to which the wash liquid, after the contents of sulfite and thiosulfate have reached a sufficiently high predetermined amount is separately re-generated by treatment with sulfurous acid.

The process can be carried out at ordinary temperature or also at an elevated temperature. As an example when carrying out the process in one stage and using a solution in which the above described ratio figure is not essentially above 1.6 a temperature of 60 to 70° C. may be resorted to. When working the process in several stages such a method has proved particularly advantageous, provided that the gas is cooled previous to treatment in the last stage. Such a method of working has incidentally the advantage that in the first stage the gas to be purified can be employed at a temperature above the dew point of water, so that the possibility arises here of carrying a "direct" process without any dilution of the absorption liquid taking place by condensation of water from the gas. When resorting to such a mode of working, the gas after having passed the first stage in which it is completely freed from ammonia and hydrogen sulfide, may be cooled, in consequence of which it loses a corresponding portion of its water, and it can then be freed from any absorbed sulfurous acid in the following stage.

Likewise a "semi-direct" process is possible according to which a portion of the ammonia is separated as gas-water by cooling of the gases previous to the entry into the washing apparatus and after being freed from the gas-water the ammonia is conducted in a concentrated form into the absorption apparatus at some suitable place. In this instance it is of course possible to convert such ammonia into ammonium bisulfite in a special apparatus and to utilize the latter for the purpose of maintaining the contents of bisulfite in the absorption liquids always at the required degree of concentration.

The concentration of wash liquids may vary within wide limits. Thus, for example, on one hand higher concentrated solutions of say from about 400 to 500 grams of ammonium salts per liter may be employed in the first washing stage, on the other hand it has also been found possible to work with advantage even with dilute solutions containing from 50 to 100 grams of ammonium salts per litre, especially in the second washing stage.

A particular advantage of the above described absorption process lies in the fact that it is completely unaffected by the presence of carbon dioxide.

The working up of the solutions obtained which consist chiefly of ammonium thiosulfate can be effected in varying manners. Thus, for example, ammonium sulfate and sulfur can be produced according to German Patent No. 264,920, in which, if necessary, a portion of the thiosulfate is converted into the polythionates, by treatment with sulfurous acid and the solution is then decomposed by heating into sulfate and sulfur, or by any other suitable method.

The sulfurous acid required for the process can be obtained in the first place advantageously by combustion of a portion of the recovered sulfur.

I claim:—

1. Process for the simultaneous absorption of ammonia and hydrogen sulfide from industrial gases containing the same which comprises effecting the absorption of the ammonia and hydrogen sulfide in a two-stage process in the first stage of which is used ammonium sulfite bisulfite wash liquid having a lower ratio figure of sulfur dioxide to ammonia than about 1.5 and in the second stage of which there is used an ammonium sulfite bisulfite wash liquid having a higher ratio figure of sulfur dioxide to ammonia than about 1.5.

2. Process for the simultaneous absorption of ammonia and hydrogen sulfide from industrial gases containing the same which comprises separating ammonia water from the gas by cooling, effecting the absorption of the residual ammonia and the hydrogen sulfide in a two-stage process in the first stage of which is used ammonium sulfite bisulfite wash liquid having a lower ratio figure of sulfur dioxide to ammonia than about 1.5 and in the second stage of which there is used an ammonium sulfite bisulfite wash liquid having a higher ratio figure of sulfur dioxide to ammonia than about 1.5, and introducing the previously separated ammonia into the wash liquid.

3. Process for the simultaneous absorption of ammonia and hydrogen sulfide from industrial gases containing the same which comprises separating ammonia water from the gas by cooling, working up the same to ammonium-bisulfite, effecting the absorption of the residual ammonia and the hydrogen sulfide in a two-stage process in the first stage of which is used ammonium sulfite bisulfite wash liquid having a lower ratio figure of sulfur bioxide to ammonia than about 1.5 and in the second stage of which there is used an ammonium sulfite bisulfite wash liquid having a higher ratio figure of sulfur dioxide to ammonia than about 1.5, and maintaining the correct bisulfite content of the wash liquor by introducing ammonium-bisulfite solution prepared from the separated ammonia.

In testimony whereof I have hereunto set my hand.

CHRISTIAN HANSEN.